April 16, 1929.  B. WEYL  1,709,642

VOLTAGE CONTROL SYSTEM

Filed Oct. 20, 1927

INVENTOR
Bruno Weyl.
BY
ATTORNEY

Patented Apr. 16, 1929.

1,709,642

UNITED STATES PATENT OFFICE.

BRUNO WEYL, OF BERLIN, GERMANY, ASSIGNOR TO WESTINGHOUSE ELECTRIC & MANUFACTURING COMPANY, A CORPORATION OF PENNSYLVANIA.

VOLTAGE-CONTROL SYSTEM.

Application filed October 20, 1927, Serial No. 227,419, and in Germany January 17, 1927.

My invention relates to voltage control systems and has particular reference to such systems wherein taps are changed under load.

In accordance with my invention, there is utilized a main transformer winding comprising a plurality of sections and a coacting auto transformer winding comprising mechanism for varying the voltage produced thereby.

Further in accordance with my invention, an auto transformer winding, as aforesaid, comprises tap changing mechanism operating jointly with tap changing mechanism of the main winding to produce minute or small variations in the voltage applied to an energy-translating device.

Further in accordance with my invention, a main transformer winding, as aforesaid, has one terminal of a suitable energy-translating device connected preferably mid-way between its ends, the other terminal of said device extending to an auto transformer winding comprising tap changing mechanism.

My invention resides in the system, mechanism, and features of construction of the character hereinafter described and claimed.

Figure 1:
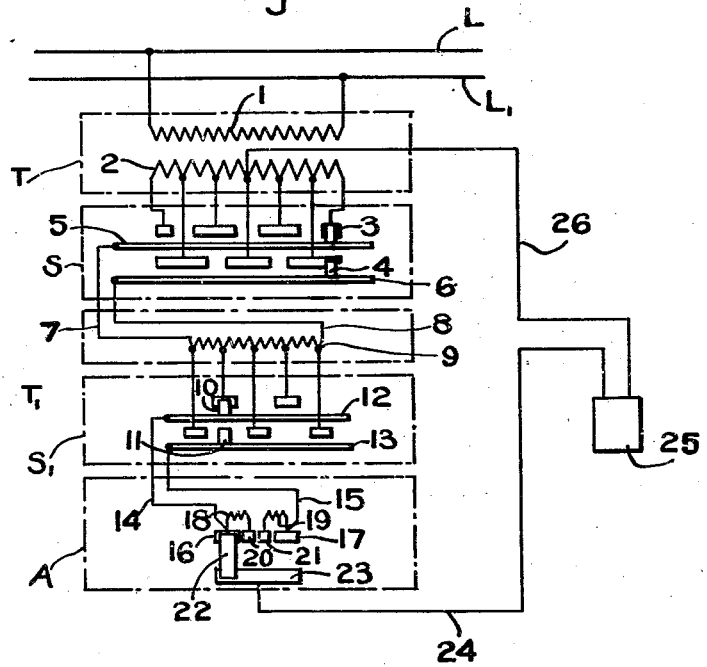
Figure 2:
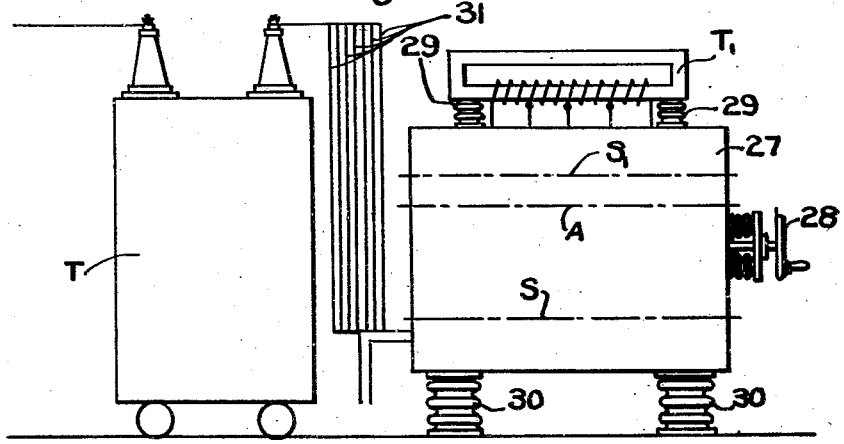

For an understanding of my invention and for an illustration of some of the forms my system or mechanism may take, reference is to be had to the accompanying drawing, in which Figure 1 is a schematic view of a voltage control system constructed in accordance with my invention, and Fig. 2 is a diagrammatic view illustrating one manner of assembling the apparatus illustrated in Fig. 1.

Referring to the drawing, there is illustrated a main auto or ordinary transformer T, the primary winding 1 of which, in the example shown, is connected to a supply circuit comprising the conductors L and $L_1$. The secondary winding 2 of transformer T comprises any suitable number of sections, connected to taps or conductive members arranged alternately for co-action with contact members 3 and 4 carried, respectively, by conductive bars or members 5 and 6.

The aforesaid taps, contact members and conductive bars comprise a regulating switch S for connecting a section of the winding 2 to the energizing circuit of the auto transformer $T_1$. Conductors 7 and 8 each connected at one end, respectively, to conductive members 5 and 6 are connected at their other ends, respectively, to the end terminals of a winding 9 constituting an auto transformer $T_1$ adapted to be connected between any two successive taps of winding 2.

A switching device $S_1$ co-acting with the auto transformer $T_1$ comprises taps or conductive members connected to sections of the winding 9 and with which alternately engage co-acting contact members 10 and 11 carried, respectively, by conductive bars or members 12 and 13, by virtue of which the taps of the winding 9 are changed.

Connected, respectively, to the contact members 12 and 13 are conductors 14 and 15 leading, respectively, to contacts 16 and 17 of a suitable arc-suppressing device A comprising bridging resistances, condensers, or the like. 18 and 19 connected, in a manner well understood in the art, to the aforesaid contacts 16 and 17 and to contacts 20 and 21 spaced therefrom. A bridging conductive member 22 co-acts, on the one hand, with the aforesaid contacts 16, 20, 21 and 17 and, on the other hand, with a contact 23 from which branches a conductor 24 leading to one terminal of a suitable energy-translating or -consuming device 25, the other terminal of which is connected by a conductor 26 to the aforesaid winding 2, and preferably to its mid-point so that both positive and negative voltage steps may be obtained. Accordingly, when changing from one tap to another, the aforesaid resistances are connected in parallel with that section of the main transformer located between adjacent taps of the winding 9.

In actual operation, the aforesaid devices are arranged preferably as indicated in Fig. 2 wherein the transformer T is structurally separated from a frame 27 in which the actuating mechanism for the movable contact members of the regulating switches S, $S_1$ and the arc suppressing device A are disposed and mechanically coupled to each other. This arrangement is diagrammatically shown in Fig. 2 wherein the axes of the various shafts comprised in the aforesaid switches and device are shown by the broken lines. The movable contact members are mounted on these shafts and, in general, may embody threaded members co-acting therewith. A hand wheel 28, suitably insulated from the frame 27, may be utilized for manipulating all of the contact members in unison and in such manner that the voltage to be applied to the device 25 may be adjusted, in the example shown, in 3×4×2=24 steps.

Preferably, the auto transformer $T_1$ is air insulated and is built as a unit with the frame 27, from which it is insulated by the insulators 29, the frame being insulated from ground by the main insulators 30. As shown in Fig. 2, conductors 31 extend from the transformer T, these representing the conductors shown in Fig. 1 as extending from the secondary winding 2 of transformer T. Conductors 31 may pass internally of frame 27 through condenser or other suitable bushings, not shown. Apparatus having the structural characteristics noted above possesses special merit in that the transformer $T_1$ may comprise any desired number of taps, dependent upon the type of regulation desired. Furthermore, the conductors branching from the taps of transformer $T_1$ to the regulating contact members may be made quite short.

The regulating switches may be manually actuated as described above, or they may be automatically actuated by a motor relay, not shown, controlled in accordance with some condition existing at the device 25.

The auto transformer $T_1$ may be constructed from bare copper wire, particularly if the voltage steps are not excessive. When thus constructed, the contact members may move in an axial direction and contact directly with the bare turns of wire, or they may be of such dimensions that their engagement with the bare wire is entirely uninterrupted. For this purpose, the winding itself may be rotated, the contact members moving in an axial direction or spirally. In this manner continuous regulation is effected and, under such circumstances, the arc suppressing device may be omitted.

With three phase installations, it is usually preferable to utilize three single phase arrangements of the character described above instead of a single three phase auto transformer.

It shall be understood that the invention is applicable to alternating current circuits comprising any number of phases.

It shall also be understood that a main transformer and an auto transformer of the character herein described may comprise different numbers of sections from that illustrated.

I claim as my invention:

1. The combination with a main transformer winding comprising a plurality of sections formed by connecting tap connections to the winding, of an auto transformer winding, means for connecting said second winding between any two adjacent named winding taps of the first named winding, and means for varying the magnitude of the voltage between the auto transformer winding and an intermediate point on the main transformer winding.

2. The combination with a main transformer winding comprising a plurality of sections, of an auto transformer winding comprising a plurality of taps, means for associating said second named winding with one of said winding sections, and tap changing means associated with said auto transformer for varying the magnitude of the voltage applied to a circuit connected between the auto transformer and an intermediate point on the main transformer winding.

3. The combination with a main transformer winding comprising a plurality of sections, of an auto transformer winding comprising a plurality of sections, means for associating said second named winding with one of said winding sections of the main transformer, means for varying the connections to the sections of said auto transformer winding, and an energy-translating device connected to an intermediate point of said main transformer winding and to said auto transformer winding.

4. The combination with a main transformer winding comprising a plurality of sections, of an auto transformer winding, means for associating said second named winding with one of said winding sections, means for varying the magnitude of the voltage produced by said auto transformer winding, and an energy-translating device connected to the mid-point of said main transformer winding and to said auto transformer winding.

In testimony whereof, I have hereunto subscribed my name this 12th day of September, 1927.

BRUNO WEYL.